United States Patent
Turberville

(10) Patent No.: US 6,874,701 B2
(45) Date of Patent: Apr. 5, 2005

(54) AREA FOGGER

(76) Inventor: Roger G. Turberville, P.O. Box 211, Uriah, AL (US) 36480

( * ) Notice: Subject to any disclaimer, the term of this patent is extended or adjusted under 35 U.S.C. 154(b) by 0 days.

(21) Appl. No.: 10/420,702

(22) Filed: Apr. 23, 2003

(65) Prior Publication Data

US 2004/0217194 A1 Nov. 4, 2004

(51) Int. Cl.$^7$ ................................................ B05B 1/24
(52) U.S. Cl. ........................ 239/129; 239/135; 239/128
(58) Field of Search ................................. 239/128–139

(56) References Cited

U.S. PATENT DOCUMENTS

| | | | |
|---|---|---|---|
| 2,835,533 A | 5/1958 | Baker | |
| 2,901,182 A | 8/1959 | Cragg et al. | |
| 3,017,121 A | 1/1962 | Carlson | |
| 3,140,574 A | 7/1964 | Brown, Jr. | |
| 3,332,221 A | 7/1967 | McCain | |
| 3,338,524 A | 8/1967 | Rhein et al. | |
| 3,595,481 A | 7/1971 | Enblom | |
| 3,722,820 A | 3/1973 | Klint, Jr. | |
| 4,153,047 A * | 5/1979 | Dumbeck | 126/400 |
| 4,269,353 A | 5/1981 | Ivandick et al. | |
| 5,062,355 A * | 11/1991 | Greiwe | 99/349 |
| 5,117,482 A * | 5/1992 | Hauber | 392/492 |
| 5,195,308 A | 3/1993 | Grote et al. | |
| 5,222,666 A | 6/1993 | Gnutel | |
| 6,263,958 B1 * | 7/2001 | Fleishman | 165/104.16 |
| 6,497,088 B1 | 12/2002 | Holley | |

FOREIGN PATENT DOCUMENTS

GB 2 238 698 A 6/1991

* cited by examiner

*Primary Examiner*—Dinh Q. Nguyen
(74) *Attorney, Agent, or Firm*—Venable LLP; Ralph P. Albrecht; Edward W. Yee

(57) ABSTRACT

The present invention is an area fogger that uses the exhaust gases and the exhaust heat produced by a 2- or 4-stroke internal combustion engine to convert a liquid chemical into a fog. More particularly, the fogger includes a unique heat distributor that is at least partially placed in the exhaust manifold, e.g., a muffler, and which distributes heat from the exhaust to the liquid chemical to form a fog. The heat distributor contains particulate material that conducts and distributes the heat to the liquid, thereby improving fog formation and effectiveness over existing systems.

4 Claims, 7 Drawing Sheets

AREA FOGGER

BACKGROUND OF THE INVENTION

1. Field of the Invention

The present invention relates to area foggers. More particularly, the area fogger is a kit that is usable with a 2- or 4-stroke engine and produces a particulate insecticide fog in an outdoor setting.

2. Description of the Related Art

Various fog-producing devices utilizing the exhaust from internal combustion engines are known.

U.S. Pat. No. 2,835,533, issued to Baker on May 20, 1958, teaches an atomizing distributor mounted on an exhaust. The device includes a nozzle placed in the exhaust pipe that atomizes an insecticide liquid. U.S. Pat. No. 2,901,182, issued to Cragg et al. on Aug. 25, 1959, teaches an engine operated insecticide sprayer.

U.S. Pat. No. 3,017,121, issued to Carlson on Jan. 16, 1962, teaches a material applying attachment for power mowers. The material is fed into the exhaust using an inserted tube. U.S. Pat. No. 3,140,574, issued to Brown, Jr. on Jul. 14, 1964, teaches a spraying and mowing apparatus. The sprayed fluid appears to be fed directly through a tube from a tank.

U.S. Pat. No. 3,332,221, issued to McCain on Jul. 25, 1967, teaches a lawn mower including a liquid spraying attachment containing an insecticide, herbicide or fertilizer, the attachment dispensing and distributing the liquid in the area of the rotating blades. A tank containing the liquid is mounted on the handle of the mower. U.S. Pat. No. 3,338,524, issued to Rhein et al. on Aug. 29, 1967, teaches a lawnmower with a handle-mounted, liquid-containing tank, which feeds the liquid through a tube to the muffler to be distributed to the surroundings.

U.S. Pat. No. 3,595,481, issued to Enblom, also teaches a fogger attached to a lawnmower that includes a handle-mounted, insecticide-holding tank and which dispenses the insecticide in the muffler. The fogger includes an air tube that brings pressurized air/exhaust from the muffler to the tank to provide the necessary pressure in the tank to produce a fog that leaves the muffler. U.S. Pat. No. 3,722,820, issued to Klint, Jr. on Mar. 27, 1973, U.S. Pat. No. 4,269,353 issued to Ivandick et al. on May 26, 1981, U.S. Pat. No. 5,195,308 issued to Grote et al. on Mar. 23, 1993, U.S. Pat. No. 5,222,666 issued to Gnutel on Jun. 29, 1993, and U.S. Pat. No. 6,497,088 issued to Holley on Dec. 24, 2002, respectively, and UK Patent No. 2238698 A, all teach similar lawnmower-attached liquid spray and fog distributing devices having various arrangements that permit the liquid to mix with the engine exhaust.

However, none teach the use of a heat-distributor that contains a heat distributing particulate material for ensuring rapid conversion of a liquid chemical into microscopic droplets which mix with exhaust to form fog.

None of the above inventions and patents, taken either singly or in combination, is seen to describe the instant invention as claimed. Thus an area fogger solving the aforementioned problems is desired.

SUMMARY OF THE INVENTION

The area fogger of the present invention is attached to an exhaust muffler of a 2-stroke or 4-stroke internal combustion engine, e.g., a lawnmower, and produces a fog that permeates an area from a liquid chemical, e.g., a pesticide solution, that is supplied to it.

Accordingly, it is a principal object of the invention to provide an area fogger that is attachable to the exhaust manifold of an internal combustion engine.

It is another object of the invention to provide an area fogger for atomizing and dispensing a liquid pesticide over a wide area.

It is a further object of the invention to provide a kit for retrofitting an internal combustion engine with an area fogger for dispensing a liquid pesticide.

Still another object of the invention is to provide an area fogger in which the heat from the exhaust manifold of an internal combustion engine is used to convert the liquid chemical into a fog that is dispersed by the exhaust into the surrounding area.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is an area fogger that uses the exhaust gases and the exhaust heat produced by a 2- or 4-stroke internal combustion engine to convert a liquid chemical into a fog. More particularly, the fogger includes a unique heat distributor that is at least partially placed in the exhaust system, e.g., a muffler housing, and which distributes heat from the exhaust to the liquid chemical to form a fog. The heat distributor contains particulate material that conducts and distributes the heat to the liquid, thereby improving fog formation and effectiveness over existing systems.

Figure 1:
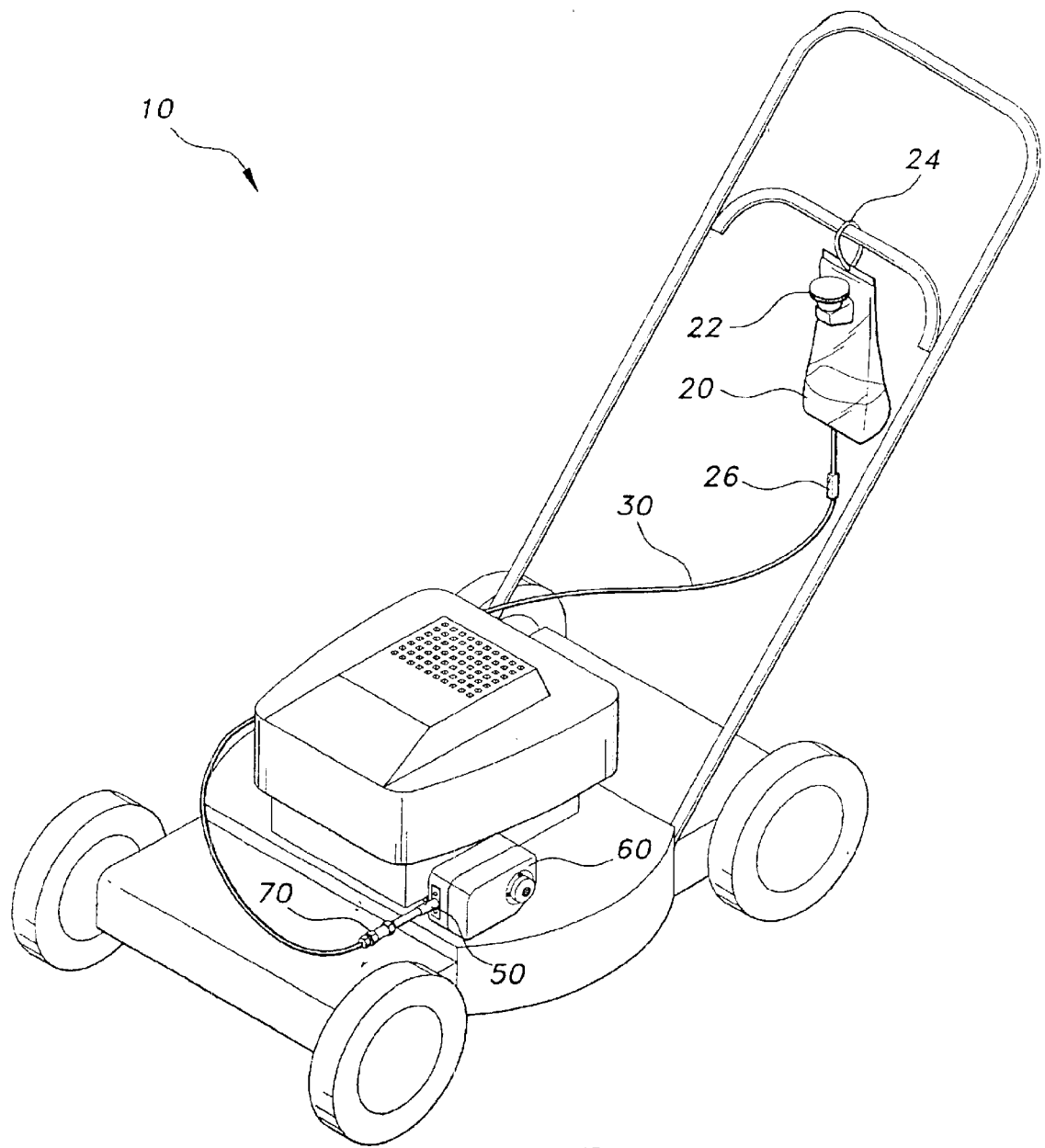
FIG. 1 is an environmental, perspective view of an area fogger according to the present invention mounted on a lawnmower.

FIG. 1 shows a lawnmower 10 provided with an area fogger of the present invention. The fogger includes a liquid chemical supply, in this case, a bag 20 containing pesticide, which is fastened to the handle of the lawnmower 24. The bag 20 has a filling spout 22. Liquid chemical flows from the bag 20 through a valve 26 and tubular supply line 30 to the heat distributor 70, and, ultimately, mixes with the exhaust gases to form a fog that exits through the muffler.

The heat distributor 70 is attached to the muffler with a mounting bracket 50.

Figure 2A:
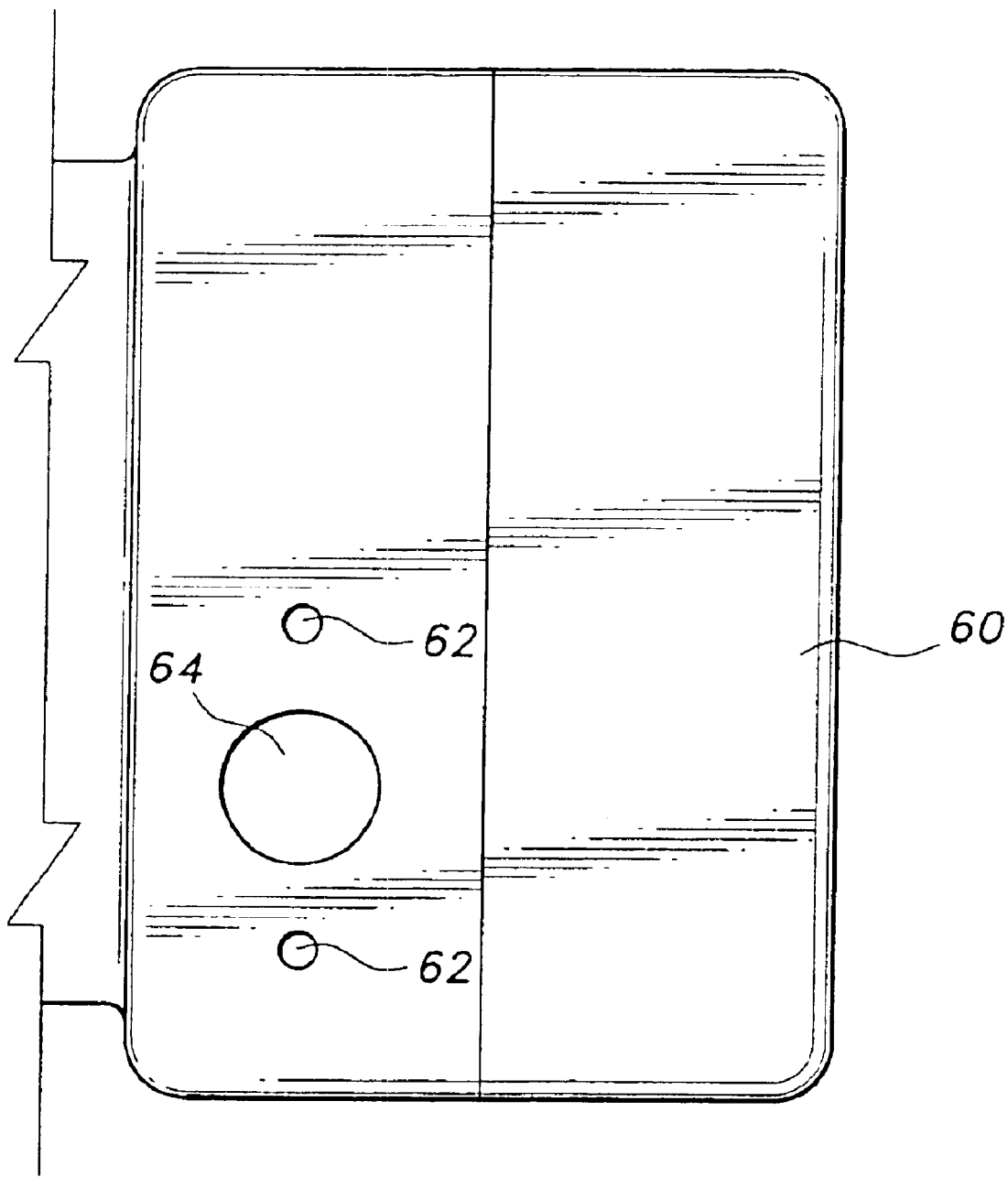
FIG. 2A shows an end view of a muffler modified to receive an area fogger according to the present invention.
Figure 2B:
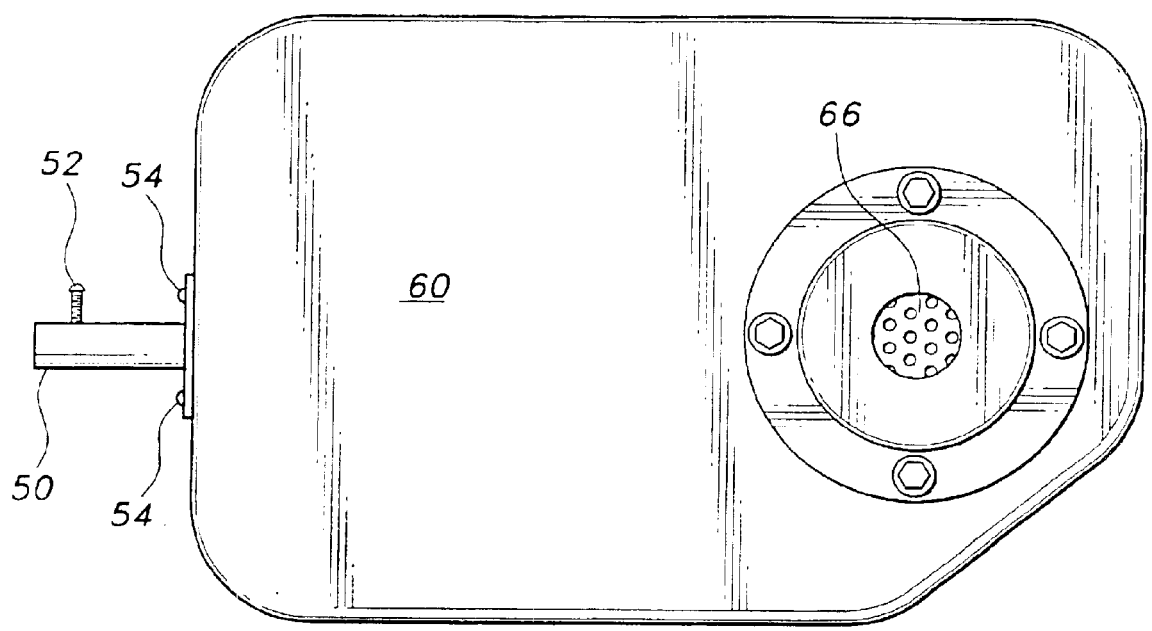
FIG. 2B shows a view of a muffler with a mounting bracket for attaching an area fogger according to the present invention attached thereto.

FIGS. 2A and 2B show a muffler modified to include the mounting bracket 50. FIG. 2A shows mounting bracket mounting holes 62 and heat distributor hole 64 defined in a muffler housing 60. These holes can be formed, e.g., by drilling into existing mufflers or exhaust housings. FIG. 2B shows the mounting bracket 50 fastened to the muffler housing 60 using fasteners 54, e.g., bolts or screws. A setscrew 52 fixes the heat distributor in place during use. The fog produced by the area fogger exits the muffler through exhaust opening 66.

Figure 3:
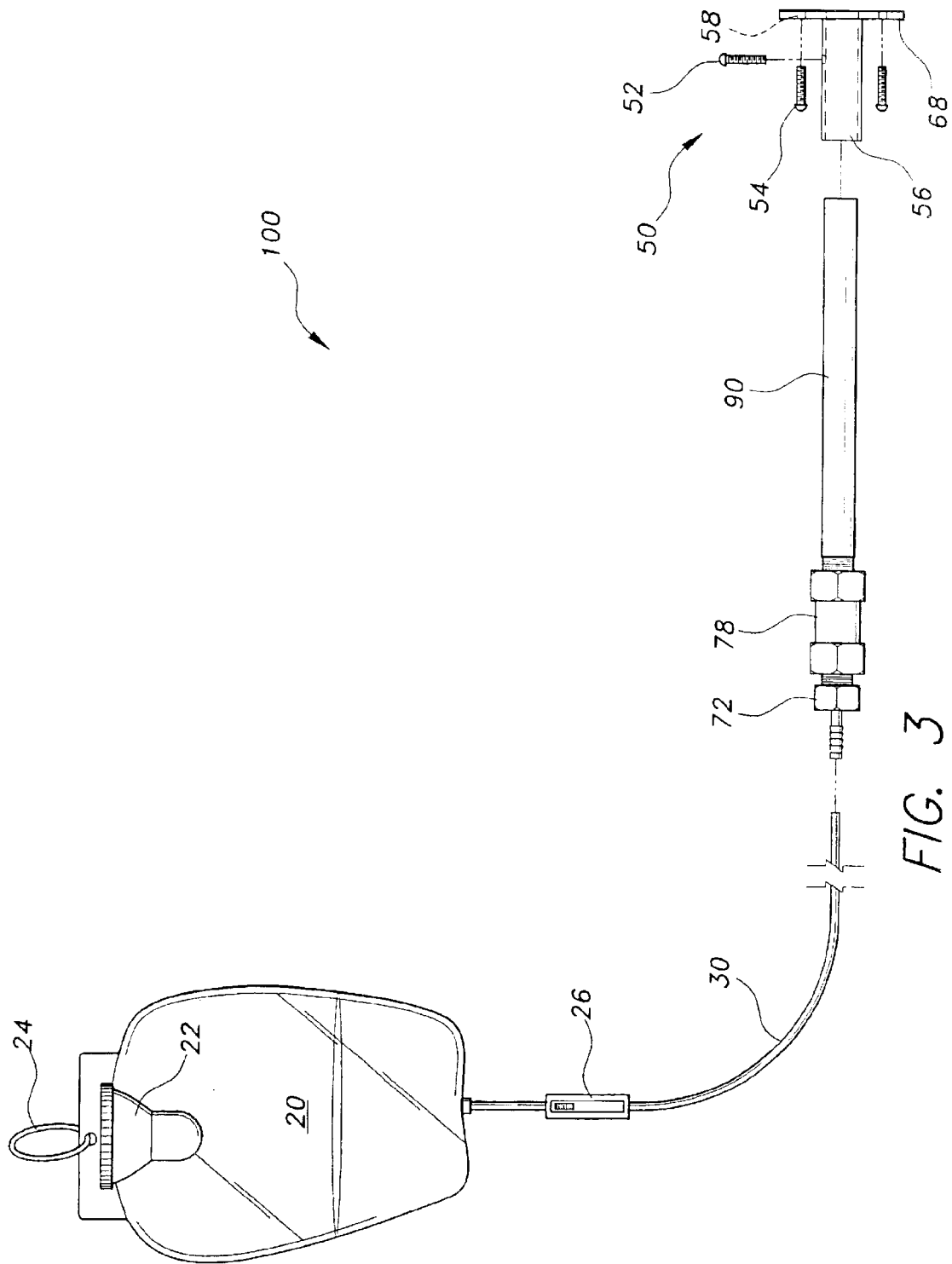
FIG. 3 is an exploded view of the fogger and mounting bracket.

FIG. 3 shows an exploded view of the fogger 100 with its mounting bracket 50. As previously described, liquid chemical, e.g., insecticide solution, from bag 20 passes through valve 26, through line 30 to the inlet connection 72 of the heat distributor. The inlet connection 72 is attached to a coupler 78 that, in turn is attached to the main body 90 of the heat distributor.

When the fogger is used, the main body 90 of the heat distributor, in this case a cylindrical tube, is at least partially inserted into the muffler through the opening 56 of the mount 50. Setscrew 52 is tightened to fix the main body of the heat distributor 90 in place.

FIG. 3 also shows screws 54 used to fasten the mounting plate 68 to the muffler using holes 58.

Figure 4A:
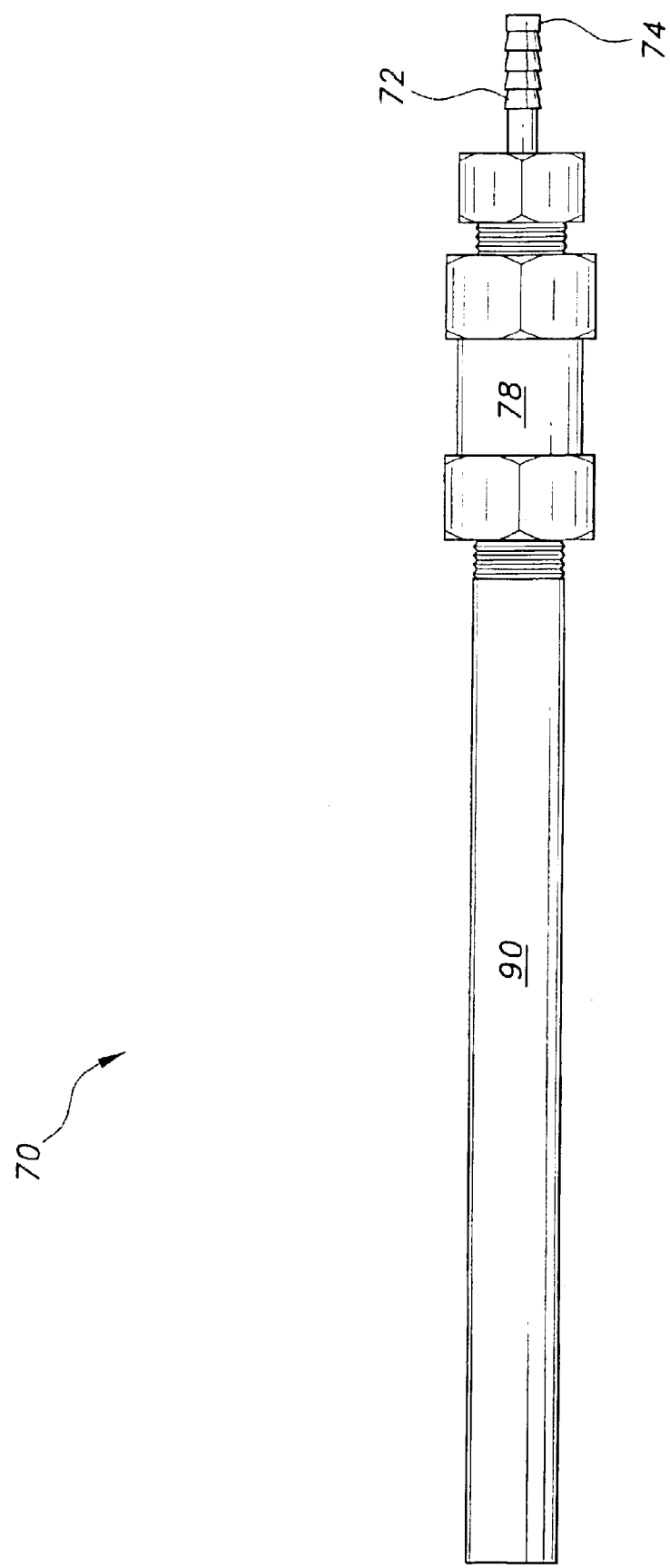
FIGS. 4A, 4B, and 4C show an elevation view, a section view, and an end view, respectively of the heat distributor of an area fogger according to the present invention.
Figure 4B:
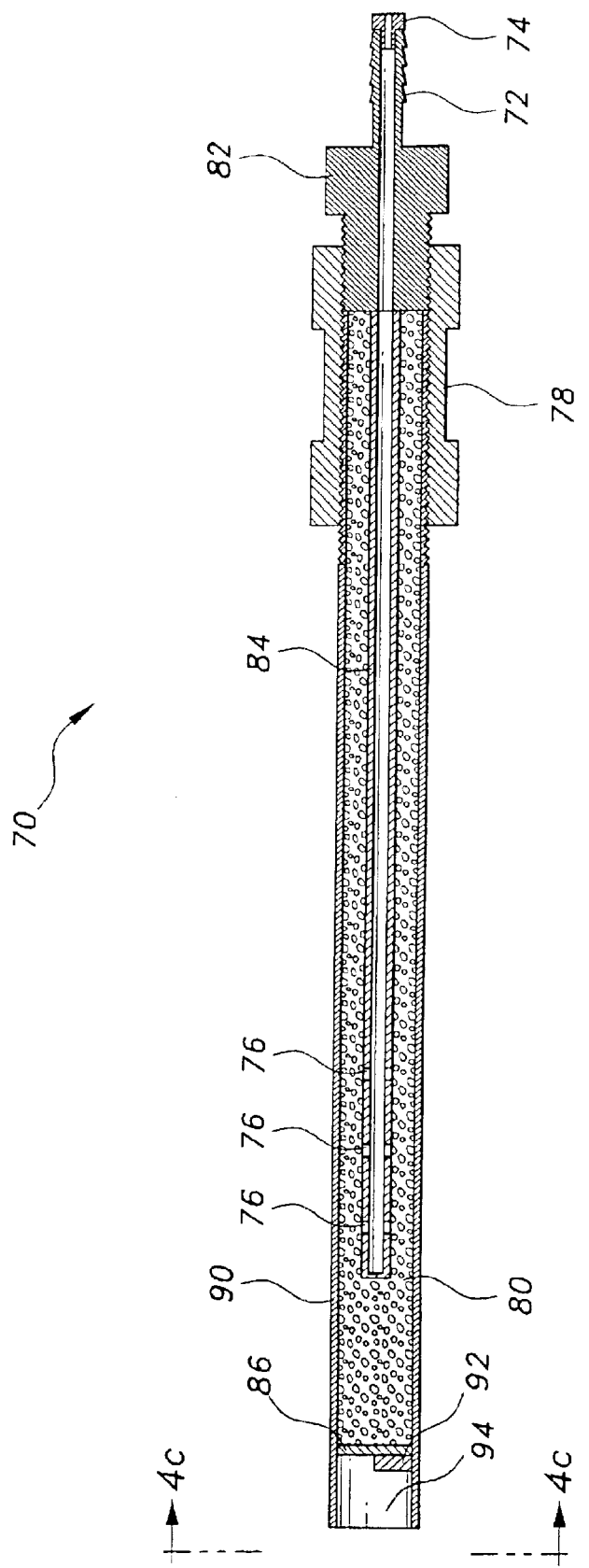
Figure 4C:
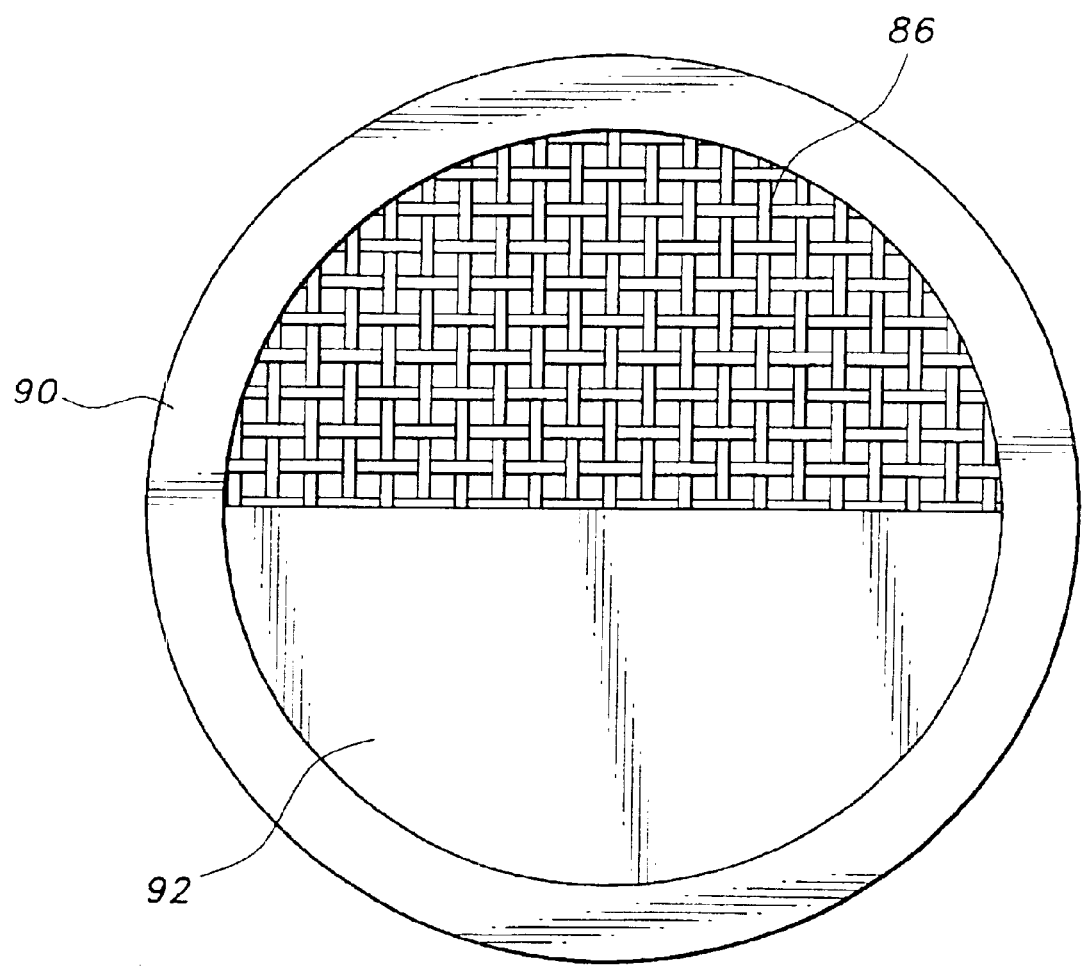

Details of the heat distributor 70 are shown in FIGS. 4A, 4B and 4C. FIG. 4A is an elevation view of the heat distributor 70 showing inlet connector 72. A metering orifice 74 is provided at the inlet opening, that is sized to permit the optimum liquid flow rate during use. Clearly the metering orifice dimensions depend upon various factors, such as the type of liquid chemical and the flow rate of exhaust gases during use.

A preferred liquid chemical is an insecticide solution containing an active ingredient, such as a pyrethrin, malathion, resmethrin or permethrin, in a carrier, such as kerosene or other hydrocarbon liquid. An example of a prepared commercially available fogger insecticide product is F100 fogger insecticide made by Burgess.

FIG. 4B shows a sectional view of the heat distributor 70. Liquid chemical enters the heat distributor at the metering orifice 74 and flows through the inlet connector 72. The inlet connector 72 is attached to coupler 78 by threaded fitting 82.

The liquid chemical then flows into liquid distributor tube 84 and exits this tube 84 through holes 76. Liquid distributor tube 84 is surrounded by heat distributing particulate material 80. An example of a suitable heat distributing particulate material is called "ceramic proppant", typically used in the oil industry in well drilling activities. The ceramic proppant is a porous ceramic particulate material that conducts heat from the exhaust gases in the muffler to the liquid chemical that flows through the heat distributor.

The liquid passing through the particulate bed 80 is converted into a thick fog, then passes through a mesh screen 86 and past a restriction, e.g., dam 92 and exits the heat distributor in the outlet 94 (shown in detail in FIG. 4C) where it is dispersed by the exhaust gas in the muffler that flows from the engine to the surrounding area.

The preferred size of liquid droplets in the fog is less than 20 microns.

During use of the area fogger, the engine is initially "warmed up" to bring the heat distributor 70 to operating temperature. In some situations, the heat distributor can become sufficiently hot to glow with a reddish color. This intense concentration of heat, along with the use of the heat distributing particulate material, ensures the rapid conversion of the liquid chemical into microscopic fog droplets.

It is to be understood that the present invention is not limited to the embodiments described above, but encompasses any and all embodiments within the scope of the following claims.

I claim:

1. An area fogger for use with an internal combustion engine equipped with an exhaust housing, comprising:

a liquid fogger chemical supply container adapted for containing a liquid chemical;

a heat distributor defining a flow passage for permitting flow of the liquid chemical through the distributor and having a particulate heat distributing material surrounding the flow passage for distributing heat from exhaust gases during operation of the engine, the heat distributor having an inlet and an outlet; and, a conduit connecting the supply container with the heat distributor;

wherein the heat distributor is adapted for being at least partially inserted in the exhaust housing, the heat distributor outlet discharging into the exhaust housing, the liquid chemical being atomized in and exiting the heat distributor and mixing with the exhaust gases, thereby forming a fog.

2. The area fogger according to claim 1, in which the particulate material is ceramic.

3. The area fogger according to claim 1 wherein the particulate material comprises ceramic proppant.

4. An area fogger kit for attachment to an exhaust housing of an internal combustion engine, comprising:

a liquid fogger chemical supply container adapted for containing a liquid chemical;

a heat distributor defining a flow passage for permitting the flow of the liquid chemical, the heat distributor having an inlet and an outlet;

a conduit connecting the supply container with the heat distributor; and a mounting bracket adapted for attaching the heat distributor to the exhaust housing, wherein the mounting bracket includes a support passage for at least partially inserting the heat distributor in the exhaust housing during use, said heat distributor containing a particulate heat distributing material surrounding the flow passage for distributing heat from exhaust gases generated during use of the engine to the liquid chemical, the liquid chemical exiting the heat distributor and mixing with the exhaust gases, thereby forming a fog.

* * * * *